US006930278B1

(12) United States Patent
Chung et al.

(10) Patent No.: US 6,930,278 B1
(45) Date of Patent: Aug. 16, 2005

(54) CONTINUOUS CALIBRATION OF A NON-CONTACT THERMAL SENSOR FOR LASER SINTERING

(75) Inventors: Tae Mark Chung, Castaic, CA (US); Jouni P. Partanen, Santa Monica, CA (US)

(73) Assignee: 3D Systems, Inc., Valencia, CA (US)

( * ) Notice: Subject to any disclaimer, the term of this patent is extended or adjusted under 35 U.S.C. 154(b) by 24 days.

(21) Appl. No.: 10/917,769

(22) Filed: Aug. 13, 2004

(51) Int. Cl.$^7$ .......................... B23K 26/00; G06F 19/00
(52) U.S. Cl. ........................... 219/121.85; 219/121.83; 700/118; 700/119
(58) Field of Search ....................... 219/121.6, 121.62, 219/121.83, 121.85; 700/118, 119

(56) References Cited

U.S. PATENT DOCUMENTS

| | | |
|---|---|---|
| 4,247,508 A | 1/1981 | Housholder |
| 4,863,538 A | 9/1989 | Deckard |
| 4,944,817 A | 7/1990 | Bourell et al. |
| 5,132,143 A | 7/1992 | Deckard |
| 5,252,264 A | 10/1993 | Forderhase et al. |
| 5,393,482 A | 2/1995 | Benda et al. |
| 5,427,733 A | 6/1995 | Benda et al. |
| 5,508,489 A | 4/1996 | Benda et al. |
| 5,530,221 A | 6/1996 | Benda et al. |
| 6,483,596 B1 * | 11/2002 | Philippi et al. ............. 356/614 |
| 6,815,636 B2 * | 11/2004 | Chung et al. ........... 219/121.65 |
| 6,822,194 B2 * | 11/2004 | Low et al. ............. 219/121.83 |

FOREIGN PATENT DOCUMENTS

| | | | |
|---|---|---|---|
| JP | 11-347761 A | * | 12/1999 |
| JP | 2004-162095 A | * | 6/2004 |

OTHER PUBLICATIONS

U.S. Pending Appl. No. 10/410,686.
Gibson, Ian and Ming, Ling Wai, "Low-Cost Machine Vision Monitoring of the SLS Process," Dept. Mechanical Engineering, The University of Hong Kong, *Solid Freeform Fabrication Symposium, 1997*, pp. 59-66, no month.

* cited by examiner

Primary Examiner—Geoffrey S. Evans
(74) Attorney, Agent, or Firm—Ralph D'Alessandro

(57) ABSTRACT

An apparatus and a method of using the apparatus wherein a radiation emitter is positioned adjacent a sensor apparatus within a process chamber in a laser sinter system that emits radiation to the sensor apparatus and a calibration apparatus receives readings from the sensor apparatus to compare temperature sensings received from the sensor apparatus with set emission signals from the radiation emitter to adjust the temperature sensings to calibrate the sensor apparatus during the forming of a three-dimensional article. The calibration is done repeatedly during the build process of the three-dimensional article.

26 Claims, 3 Drawing Sheets

CONTINUOUS CALIBRATION OF A NON-CONTACT THERMAL SENSOR FOR LASER SINTERING

BACKGROUND OF THE INVENTION

This invention relates to the field of freeform fabrication, and more specifically is directed to the fabrication of three-dimensional objects by selective laser sintering utilizing an improved thermal sensing system to ensure accurate temperature sensings of the powder part bed.

The field of freeform fabrication of parts has, in recent years, made significant improvements in providing high strength, high density parts for use in the design and pilot production of many useful articles. Freeform fabrication generally refers to the manufacture of articles directly from computer-aided-design (CAD) databases in an automated fashion, rather than by conventional machining of prototype articles according to engineering drawings. As a result, the time required to produce prototype parts from engineering designs has been reduced from several weeks to a matter of a few hours.

By way of background, an example of a freeform fabrication technology is the selective laser sintering process practiced in systems available from 3D Systems, Inc., in which articles are produced from a laser-fusible powder in layer-wise fashion. According to this process, a thin layer of powder is dispensed and then fused, melted, or sintered, by laser energy that is directed to those portions of the powder corresponding to a cross-section of the article. Conventional selective laser sintering systems, such as the Vanguard system available from 3D Systems, Inc., position the laser beam by way of galvanometer-driven mirrors that deflect the laser beam. The deflection of the laser beam is controlled, in combination with modulation of the laser itself, to direct laser energy to those locations of the fusible powder layer corresponding to the cross-section of the article to be formed in that layer. The computer based control system is programmed with information indicative of the desired boundaries of a plurality of cross sections of the part to be produced. The laser may be scanned across the powder in raster fashion, with modulation of the laser affected in combination therewith, or the laser may be directed in vector fashion. In some applications, cross-sections of articles are formed in a powder layer by fusing powder along the outline of the cross-section in vector fashion either before or after a raster scan that "fills" the area within the vector-drawn outline. In any case, after the selective fusing of powder in a given layer, an additional layer of powder is then dispensed, and the process repeated, with fused portions of later layers fusing to fused portions of previous layers as appropriate for the article, until the article is complete.

Detailed description of the selective laser sintering technology may be found in U.S. Pat. Nos. 4,863,538; 5,132,143; and 4,944,817, all assigned to Board of Regents, The University of Texas System, and in U.S. Pat. No. 4,247,508 to Housholder, all hereby incorporated by reference.

The selective laser sintering technology has enabled the direct manufacture of three-dimensional articles of high resolution and dimensional accuracy from a variety of materials including polystyrene, some nylons, other plastics, and composite materials such as polymer coated metals and ceramics. Polystyrene parts may be used in the generation of tooling by way of the well-known "lost wax" process. In addition, selective laser sintering may be used for the direct fabrication of molds from a CAD database representation of the object to be molded in the fabricated molds; in this case, computer operations will "invert" the CAD database representation of the object to be formed, to directly form the negative molds from the powder.

Current commercial laser sintering systems, such as those sold by 3D Systems, Inc. of Valencia, Calif., utilize dual piston cartridge feed systems with a counter-rotating roller and an infrared sensor or pyrometer to measure the thermal conditions in the process chamber and the powder bed.

Although laser sintering systems have proven to be very effective in delivering both powder and thermal energy in a precise and efficient way, the process is thermally based and requires accurate sensings of the powder temperature in the process chamber. The basic problem with attempting to accurately sense the temperature of the powder in a laser sintering system is the fact that contact measurements cannot be made of the powder since powder is constantly in flux during the laser sintering process. Additionally contact sensors are slow, position sensitive, and prone to being disturbed or jarred by bumping. Because of this and since there is no way to ensure consistent contact with the powder without interfering with the powder's movement and hence reducing the accuracy of the measurement, IR sensors have been utilized to attempt to accurately determine the temperature of the powder within the process chamber.

However, the use of a single infrared (IR) sensor focused on one spot on the target surface has some known limitations. These include the lack of a uniform temperature across the entire target surface, possible thermal gradients from front-to-back and from side-to-side of the process chamber and part powder bed, and the fact that the recently fused part in the system is hotter than the surrounding powder. Recognizing these and other limitations, investigators have proposed other approaches to temperature control in laser sintering systems.

One approach has been to address one aspect of temperature control based on an optics and scanning system that detects the temperature of the powder at a detection point near the sintering location and uses that information to modify the laser power and/or modify the temperature of the surrounding powder by use of a traveling defocused laser beam. In this approach and others similar to it, the control is achieved by control of the laser beam power and not by control of a radiant heater. This approach suffers from the required sophistication and expense of the optics system, as well as issues concerning the quality of the radiated temperature signal from the powder as different powders are employed.

Another approach used a machine vision system (a CCD camera) to focus on the target surface of a laser sintering process and measured gray scale color variation of the surface to calculate temperature and modify laser power to maintain consistent part quality. This approach resulted in a lower cost, simpler implementation, but was still based on an average temperature value measured by the camera system.

Still another approach proposes measuring temperatures all across the target surface and making both global (radiant heater) and local (laser) adjustments to the heat input in order to maintain uniform temperatures through the use of a vision system employing an infrared camera to obtain the actual temperatures in the region of the part being produced.

Any system utilizing optics to perform sensing has the inherent problem that the optics degrade over time, thereby decreasing the transmission of signals because of degradation of the electronics, build-up on the optics of absorptive components in the gas within the process chamber or from damage to the optics. Optics degradation can result in the melt down or delamination of parts being fabricated during a build process because of inaccurately low sensor readings that call for increase in heat from the IR heaters until the temperature of the powder being exposed by the laser exceeds its melting point. Alternatively, current systems estimate the optics degradation and attempt to compensate by implementing a temperature ramping downwardly to avoid excess heating. This ramping can cause too low of a part powder bed temperature that results in part distortion, such as "potato chip" type of curling. Both of these phenomena destroy the build.

Thus a need exists for a temperature control scheme for laser sintering that is not limited by the degradation over time of the optics utilized to perform temperature sensings and is able to obtain accurate temperature sensings of the powder in the part bed and the powder feed bed areas within the process chamber of a laser sintering system.

BRIEF SUMMARY OF THE INVENTION

It is an aspect of the present invention that an apparatus and method are provided which use a black body radiation emitter to provide continuous readings to continuously calibrate an IR sensor that measures temperature at the surface of a layer of fresh powder in a laser sintering system to adjust the IR sensor reading as the optics of the sensor become dirty or damaged over time and control via a feedback signal the temperature of the IR heaters to provide a constant temperature at the interface of the fresh powder layer and the previous layer of powder exposed by the thermal source.

It is another aspect of the present invention to provide a method and means to perform accurate non-contact measurements to determine the temperature of the powder in the part bed and powder feed beds of a laser sintering system.

It is a feature of the present invention that an IR sensor measures the energy emissions of the black body radiation emitter and recalibrates the IR sensor reading to compensate for decreased sensing transmission through the IR sensor optics over time as those transmissions decrease because of build-up of absorptive components in the gas within the process chamber or because of optical damage.

It is another feature of the present invention that the black body radiation emitter's signal emission is set at a desired level based on the desired temperature of the powder at the particular location in the process chamber of a laser sintering system.

It is still another feature of the present invention that the IR sensor is continually recalibrated during the system operation by the positioning of a black body radiation emitter adjacent to the IR sensor optics and the IR sensors control the IR heaters to increase or decrease heat output from the heaters during operation.

It is an advantage of the present invention that the build temperatures within the process chamber of the laser sintering system are accurately monitored throughout the build process.

It is another advantage of the present invention that the laser sintering system is automatically calibrated on a layer-by-layer basis throughout the build to enable parts to be built with highly consistent mechanical properties throughout the part geometry and to be highly repeatable from build-to-build and system-to-system.

It is still another advantage of the present invention that the laser sintering system employing the invention is easy to use and requires less operator training with reduced skill in order to achieve consistent, repeatable, high-quality parts.

It is yet another advantage of the present invention that parts attained from a laser sintering system employing the present invention require less post-processing.

It is yet another advantage of the present invention that improved powder material recycling is obtained.

BRIEF DESCRIPTION OF DRAWINGS

These and other aspects, features and advantages of the invention will become apparent upon consideration of the following detailed disclosure, especially when taken in conjunction with the accompanying drawings wherein.

DETAILED DESCRIPTION OF THE INVENTION

Figure 1:
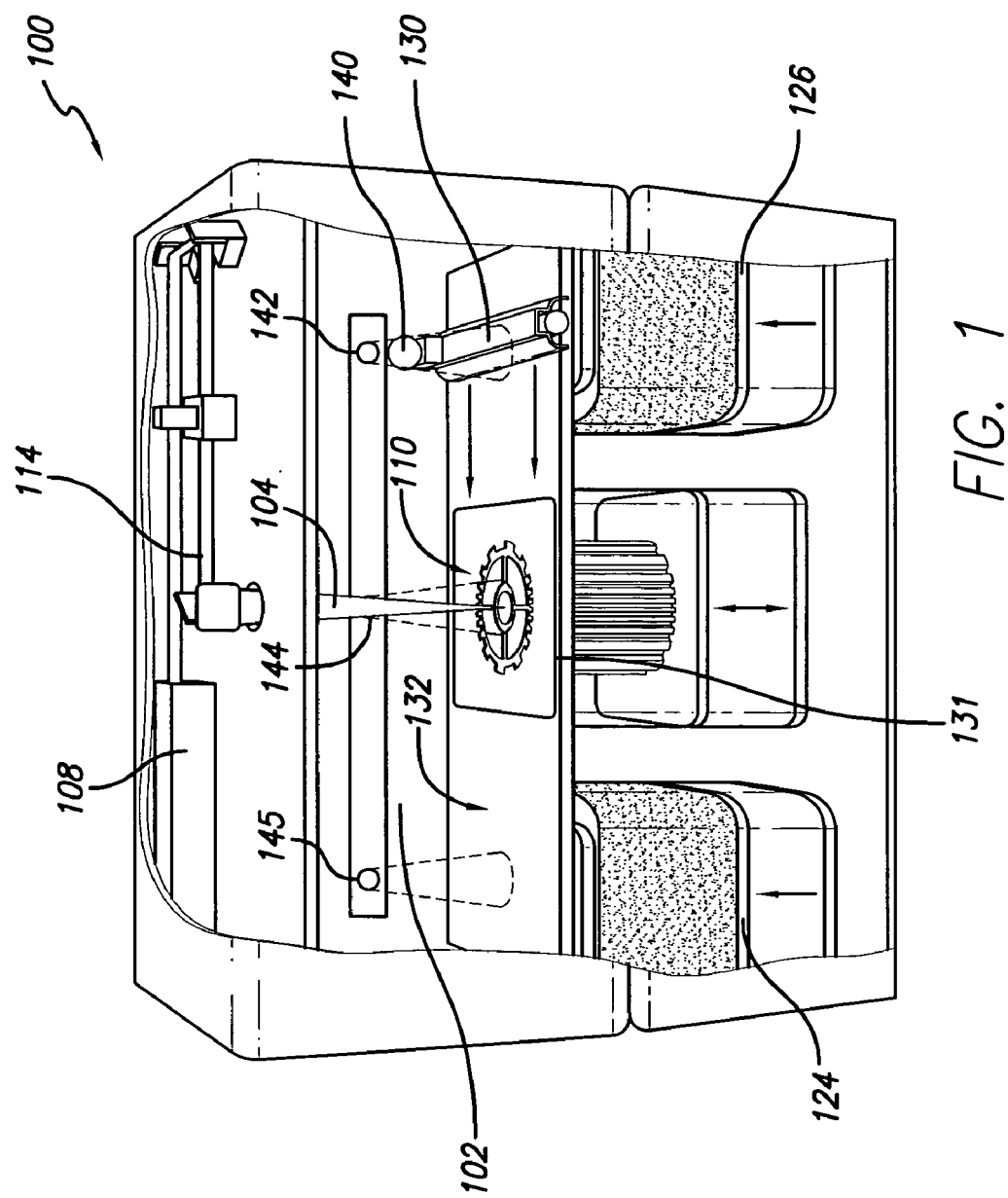
FIG. 1 is a diagrammatic illustration of a selective laser sintering machine with portions cut away showing the location of the IR sensors within the process chamber.

FIG. 1 illustrates a rendering of a selective laser sintering system indicated generally by the numeral 100. Such a system is currently sold by 3D Systems, Inc. of Valencia, Calif. FIG. 1 is a rendering shown with the doors removed for clarity. A carbon dioxide laser and its associated optics are shown mounted in a unit above a process chamber 102. The process chamber 102 includes a powder bed 132, two powder feed systems 124 and 126, and a leveling roller 130. A black body radiation emitter 140 is shown mounted to the leveling or counter-rotating roller 130. Within the process chamber 102 the appropriate temperature and atmospheric composition for the fabrication of the article are maintained. The atmosphere is typically an inert atmosphere, such as nitrogen.

Figure 2:
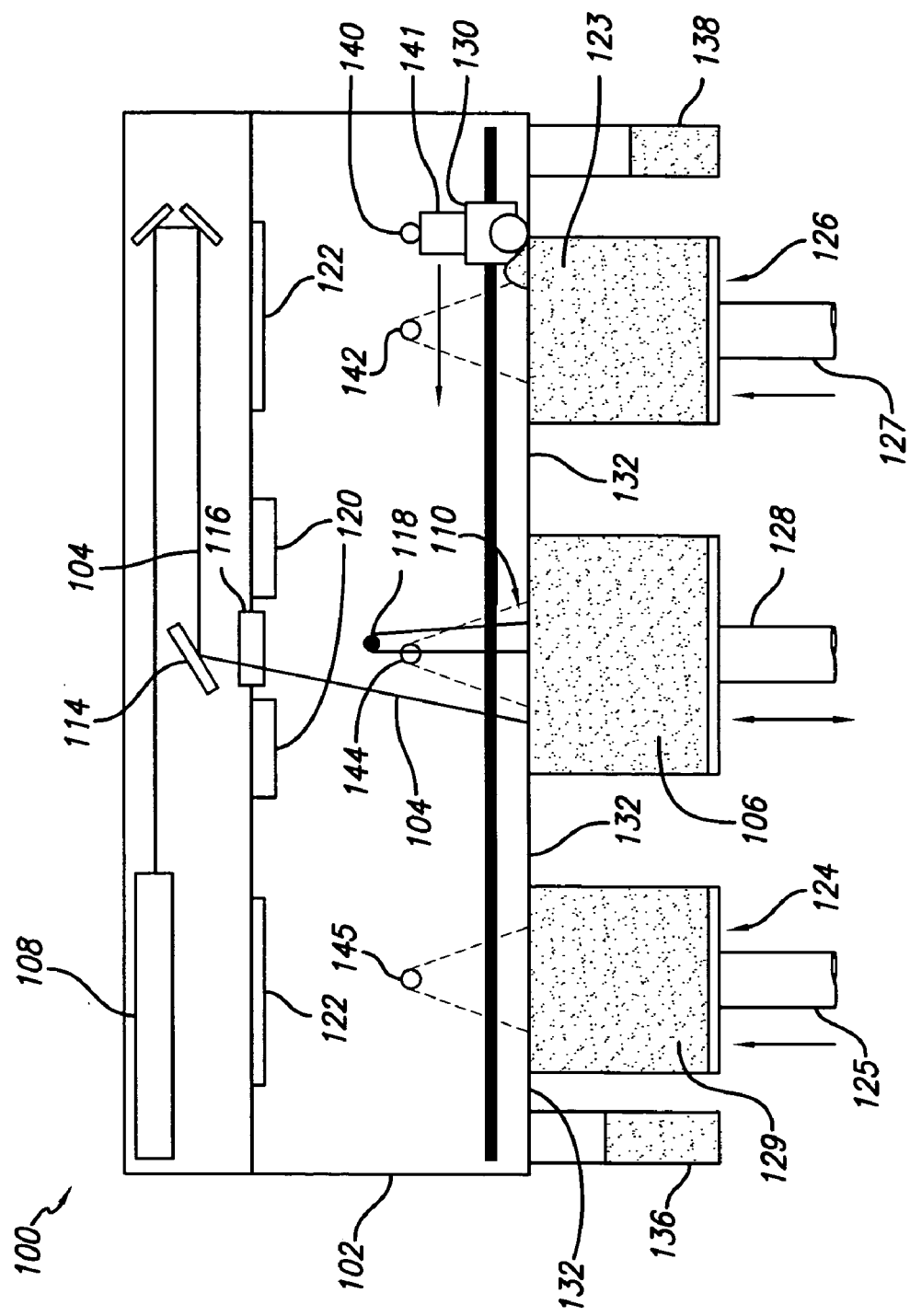
FIG. 2 is a diagrammatic front elevational view of a conventional selective laser sintering machine in operation showing the radiation emitter and the IR sensors.

Operation of this conventional selective laser sintering system 100 is shown in FIG. 2 in a front view of the system with the doors removed for clarity to illustrate the laser sintering process. A laser beam 104 is generated by laser 108, and aimed at target surface or area 110 by way of scanning system 114 that generally includes galvanometer-driven mirrors that deflect the laser beam. The laser and galvanometer systems are isolated from the hot process chamber 102 by a laser window 116. The laser window 116 is situated within radiant heater elements 120 that heat the target area 110 of the part bed below. These heater elements 120 may be ring-shaped (rectangular or circular) panels or radiant heater rods that surround the laser window 116. The deflection and focal length of the laser beam are controlled, in combination with the modulation of laser 108 itself, to direct laser energy to those locations of the fusible powder layer corresponding to the cross-section of the article to be formed in that layer. Scanning system 114 may scan the laser beam across the powder in a raster-scan fashion, or in vector fashion. It is understood that scanning entails the laser beam intersecting the powder surface in the target area 110.

Two feed systems (124, 126) feed powder into the system by means of push-up pistons (125, 127). A part bed 132 receives powder from the two feed pistons as described immediately hereafter. Feed system 126 first pushes up a measured amount of powder and a counter-rotating roller 130 picks up and spreads the powder over the part bed 132 in a uniform manner. The counter-rotating roller 130 passes completely over the target area 110 and part bed 132. Any residual powder is deposited into an overflow receptacle 136. Positioned nearer the top of the chamber are radiant heater elements 122 that pre-heat the feed powder and a ring or rectangular shaped radiant heater element 120 for heating the part bed surface. Element 120 has a central opening which allows a laser beam to pass through the laser window 116 that isolates the laser and optics from the higher temperature environment of the process chamber 102. Radiant heating elements 122 which provide heat to the part bed and to the areas immediately next to the part bed can be any number of types including, for example, quartz rods or flat panels. One design is fast response quartz rod heaters.

After a traversal of the counter-rotating roller 130 across the part bed 132 the laser selectively fuses the layer just dispensed. The roller then returns from the area of the overflow receptacle 136, after which the feed system 124 pushes up a prescribed amount of powder and the roller 130 dispenses powder over the target area 110 in the opposite direction and proceeds to the other overflow receptacle 138 to deposit any residual powder. Before the roller 130 begins each traverse of the part bed 132 the center part bed piston 128 drops by the desired layer thickness to make room for additional powder.

The powder delivery system in system 100 includes feed pistons 125 and 127. Feed pistons 125 and 127 are controlled by motors (not shown) to move upwardly and lift, when indexed, a volume of powder from the powder feed beds (123, 129) into chamber 102. Part piston 128 is controlled by a motor (not shown) to move downwardly below the floor of chamber 102 by a small amount, for example 0.125 mm, to define the thickness of each layer of powder being processed. Roller 130 is a counter-rotating roller that translates powder from feed systems 124 and 126 onto target surface 110. When traveling in either direction the roller carries any residual powder not deposited on the target area into overflow receptacles (136, 138) on either end of the process chamber 102. Target surface 110, for purposes of the description herein, refers to the top surface of heat-fusible powder (including portions previously sintered, if present) disposed above part piston 128. The sintered and unsintered powder disposed on part piston 128 will be referred to herein as part cake 106. System 100 of FIG. 2 also requires radiant heaters 122 over the feed pistons (125, 127) to pre-heat the powders to minimize any thermal shock as fresh powder is spread over the recently sintered and hot target area 110. This type of dual piston feed system provides fresh powder from below the target surface 110, with heating elements for both feed beds (123, 129).

Other known powder delivery systems use overhead hoppers to feed powder from above and either side of target area 110 in front of a delivery apparatus such as a counter-rotating roller or a wiper or scraper. The black body radiation emitter 140 can be employed with either a counter-rotating roller or an overhead hopper type of a powder delivery system utilizing either a dual side feed or a single side feed system. Black body radiation emitter 140 may be mounted on the powder dispenser or otherwise mounted to be able to be placed adjacent the non-contact sensors, preferably IR sensors, (142, 144, 145) as frequently as desired to ensure repeated or continuous calibration, as desired, of the IR sensors during the build process. Typically the black body radiation emitter 140 will be positioned adjacent, and preferably in the embodiment shown in FIGS. 1 and 2, in front of the IR sensors 142, 144, and 145 on each pass across the powder bed 132 by the counter-rotating roller 130 to permit continuous calibration of the IR sensors 142, 144, and 145. However, it may only need be placed adjacent the IR sensors every other pass or another sequence of regular positionings to repeatedly permit the calibration of the IR sensors 142, 144, and 145 to occur during the build process.

The black body radiation emitter 140 is a radiometric calibration target commercially available from a number of sources including the Highland Plating Company of Los Angeles, Calif., and Mikron Infrared, Inc. of Oakland, N.J. The black body radiation emitter 140 has a high emissivity anodized black coating and is constructed from a suitable metal, such as aluminum. The black body radiation emitter 140 has its own temperature control and its emission is monotonically related to its temperature. The temperature of the black body radiation emitter 140 is set to provide optimal performance based on experiential data from the operation of the particular type of laser sintering system 100 for the particular powder employed. Each type of powder will have its own optimal process temperature and thus different powders will emit different radiation levels that will be sensed by the IR sensors 142, 144, and 145. The IR sensors 142, 144, and 145 are non-contact thermal sensors that send the emission readings from the black body radiation emitter 140 to the laser sintering system computer (not shown) which uses IR sensor calibration curves to convert the IR energy emitted to a temperature. The computer then compares the emission measured by the IR sensor for the particular location on the powder bed 132 to the known set emission from the black body radiation emitter 140 and its equivalent temperature to adjust the IR sensing to compensate for any degradation in the IR sensing due to powder dust, dirt or absorptive components in the process chamber 102 gas that collect on the sensor optics over time or damage that may occur to the optics which reduce the sensor transmissions. As best seen in FIGS. 1 and 2, the IR sensors 142, 144, and 145 have fields of sensings directed to the surface of the powder feed beds 123, 129 and the part cake 106 as indicated by the dotted lines. The black body radiation emitter 140 covers the area of the field of sensing of each sensor when it is positioned adjacent to each IR sensor 142, 144, and 145. This is diagrammatically illustrated in FIG. 1.

Figure 3:
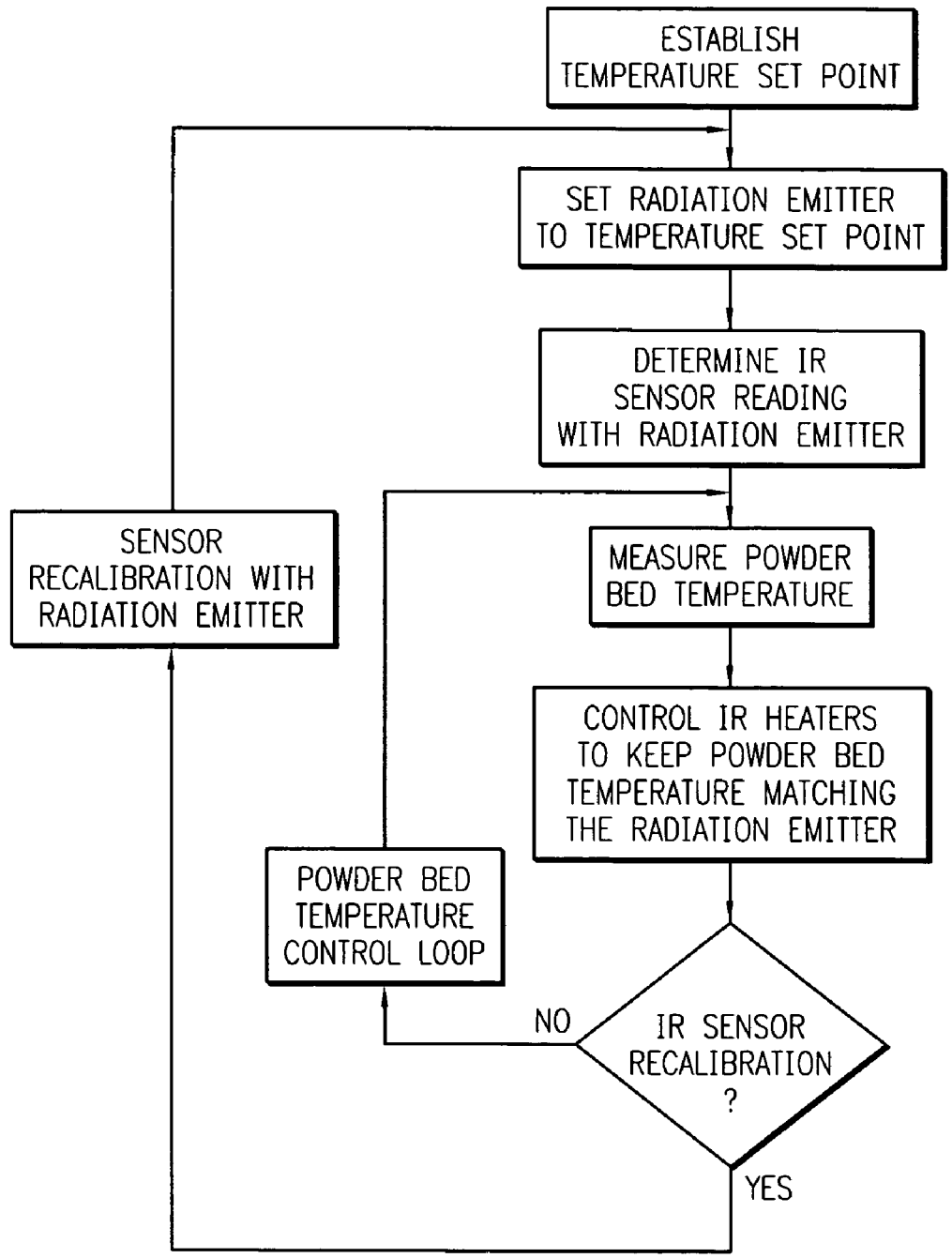
FIG. 3 is a flow diagram showing the data flow among the IR sensors, the radiation emitter and the IR heaters to provide continuous calibration of the IR sensors during operation.

The experiential data utilized to set the optimum performance of the laser sintering system, as stated above, will vary with the specific powder used. Generally the glaze point, or melting temperature, of the powder is utilized as the start point and a fixed degree differential below that point is set on the black body radiation emitter 140 to be used to calibrate the IR sensors 142, 144, and 145. For example, for nylon 12 polyamide powder the melting point of about 186° C.±1° is known and the set point on the black body radiation emitter is established a desired number of degrees below that to provide the reference point for the computer to compare with the sensings of the powder bed temperatures from the IR sensors 142, 144, and 145 as their transmitted readings may degrade over time. This set point, for example, may be 5 or 7 degrees below the melting point of the nylon 12 polyamide powder, that is about 181° C. or 179° C. By utilizing the black body radiation emitter 140 to calibrate the IR sensors repeatedly during the build process, any uncertainty about the accuracy of the IR sensor readings is removed since if the sensor optics readings change for the powder bed sensings, they do so in the same ratio as the sensings from the black body radiation emitter 140 for which there is a known emission corresponding to a set temperature selected from experiential data that has established the optimal temperature at which the fresh powder layer in process chamber 102 should be kept at the target surface 110. This then permits the IR sensors to be calibrated so that the sensings at the target surface 110 and the surface of the powder feed beds (123, 129) permit the computer to accurately control the temperatures at those locations by controlling the thermal energy supplied by the IR heaters 120 and 122, respectively according to the logic as seen in the flow chart in FIG. 3.

The non-contact thermal sensors are preferably IR sensors 142, 144, and 145 that may either use the ratio of different wavelengths or the total amount of light of a desired bandwidth. A bandwidth of 8 to 14 microns is preferred to sense the powder bed 132.

While the invention has been described above with references to specific embodiments, it is apparent that many changes, modifications and variations in the materials, arrangement of parts and steps can be made without departing from the inventive concept disclosed herein. Accordingly, the spirit and broad scope of the appended claims is intended to embrace all such changes, modifications and variations that may occur to one of skill in the art upon a reading of the disclosure. For example, a shutter arrangement in conjunction with a pivoting support could be used to present the black body radiation emitter to the IR sensor, or a plurality of radiation emitters could be used with a shutter arrangement. Any appropriate emitter can be employed as the radiometric calibration target having a known emissivity for the IR sensors to sense. All patent applications, patents and other publications cited herein are incorporated by reference in their entirety.

What is claimed is:

1. A method for forming a three dimensional article by laser sintering comprising the steps of:
    (a) delivering a quantity of powder adjacent a target area in a process chamber;
    (b) spreading the quantity of powder with a spreading mechanism to form a layer of powder;
    (c) heating the powder while adjacent to the target area, while it is spread and as it lies as a layer;
    (d) directing an energy beam over the target area causing the layer of powder to form an integral layer; and
    (e) repeating steps (a) to (d) to form additional layers that are integrally bonded to adjacent layers so as to form a three dimensional article, wherein during at least one layer forming step a radiation emitter positioned adjacent a sensor means within the process chamber emits radiation to the sensor means and a calibration means receives readings from the sensor means to compare temperature sensings received from the sensor means with set emission signals from the radiation emitter converted to temperatures from the radiation emitter to adjust the temperature sensings to thereby calibrate the sensor means during the forming of the three dimensional article.

2. The method of claim 1 further comprising using a non-contact thermal sensor as the sensor means.

3. The method of claim 2 further comprising using an IR sensor as the non-contact thermal sensor.

4. The method of claim 1 further comprising using a plurality of IR sensors within the process chamber.

5. The method of claim 1 further comprising using an IR heater to heat the powder in the process chamber.

6. The method of claim 1 further comprising positioning the radiation emitter adjacent the sensor means during each layer forming step to continuously calibrate the sensor means during the forming of the three-dimensional object.

7. The method of claim 1 further comprising using a black body as the radiation emitter.

8. The method of claim 7 further comprising using a computer and calibration curves to adjust the temperature sensings.

9. The method of claim 1 further comprising using a laser beam in the energy beam directing step.

10. The method of claim 9 further comprising using a carbon dioxide laser to provide the laser beam.

11. The method of claim 1 further comprising using a roller or a wiper blade as the spreading mechanism.

12. The method of claim 11 further comprising using a counter-rotating roller as the roller.

13. An apparatus for producing parts during a build process from a powder comprising in combination:
    (a) a chamber having a target area at which an additive process is performed, the target area having a first side and an opposing second side;
    (b) fusing means for fusing selected portions of a layer of powder at the target area;
    (c) powder feed means for feeding the powder into the chamber;
    (d) spreading means for spreading powder over the target area;
    (e) heating means for providing thermal energy to the powder in the process chamber;
    (f) sensor means to provide sensings of the temperature of the powder in the process chamber and send readings used to adjust the heating means;
    (g) radiation emitter means set to a desired emission corresponding to a desired temperature to provide radiation emissions at a desired level; and
    (h) calibration means to adjust the sensings of the sensor means based on a comparison of the radiation emissions to temperatures to accurately reflect the temperature of the powder and send data to the heating means to adjust the thermal energy provided by the heating means.

14. The apparatus of claim 13 wherein the means for spreading comprises a roller and a motor coupled to the roller for moving the roller across the target area to level the powder in a layer.

15. The apparatus of claim 14 wherein the heating means for providing thermal energy to the powder comprises at least one radiant heater.

16. The apparatus of claim 14 wherein the means for fusing selected portions of a layer of the powder at the target area comprises:
    (a) a energy beam;
    (b) an optics mirror system to direct the energy beam; and
    (c) energy beam control means coupled to the optics mirror system including computer means, the computer means being programmed with information indicative of the desired boundaries of a plurality of cross-sections of the part to be produced.

17. The apparatus of claim 16 wherein the energy beam is a laser energy beam.

18. The apparatus of claim 15 wherein the at least one radiant heater is an IR heater.

19. The apparatus according to claim 13 further comprising a wiper blade and a motor coupled to the wiper blade for moving the wiper blade across the target area to spread the powder.

20. The apparatus according to claim 13 wherein the radiation emitter means is repeatedly positioned adjacent the sensor means during the build process.

21. The apparatus according to claim 13 wherein the radiation emitter means is mounted to the means for spreading powder.

22. The apparatus according to claim 13 wherein the radiation emitter means is a black body.

23. The apparatus according to claim 13 wherein the sensor means is a non-contact thermal sensor.

24. The apparatus according to claim 13 wherein the sensor means is an IR sensor.

25. The apparatus according to claim 13 wherein the sensor means comprises a plurality of sensors within the process chamber.

26. The apparatus according to claim 13 wherein the calibration means is a computer controller that utilizes calibration curves to adjust the sensings.

* * * * *